(12) United States Patent
Shimoyama

(10) Patent No.: US 8,350,421 B2
(45) Date of Patent: Jan. 8, 2013

(54) MOTOR AND IT'S MANUFACTURING METHOD

(75) Inventor: Takeshi Shimoyama, Nagano (JP)

(73) Assignee: Nidec Sankyo Corporation (JP)

( * ) Notice: Subject to any disclaimer, the term of this patent is extended or adjusted under 35 U.S.C. 154(b) by 732 days.

(21) Appl. No.: 12/352,329

(22) Filed: Jan. 12, 2009

(65) Prior Publication Data

US 2009/0179512 A1 Jul. 16, 2009

(30) Foreign Application Priority Data

Jan. 10, 2008 (JP) ................. 2008-002769

(51) Int. Cl.
  *H02K 37/00* (2006.01)
(52) U.S. Cl. .............. 310/49.02; 310/89; 310/49.11
(58) Field of Classification Search .......... 310/49.02, 310/49.11, 89
See application file for complete search history.

(56) References Cited

U.S. PATENT DOCUMENTS

| | | | |
|---|---|---|---|
| 6,317,287 B1 * | 11/2001 | Yano et al. | 360/260 |
| 7,348,696 B2 * | 3/2008 | Sonohara et al. | 310/49.08 |
| 7,825,556 B2 * | 11/2010 | Suzuki et al. | 310/90 |
| 2005/0285473 A1 * | 12/2005 | Kobayashi | 310/261 |
| 2006/0261684 A1 * | 11/2006 | Sonohara et al. | 310/49 R |
| 2007/0164625 A1 * | 7/2007 | Kobayshi | 310/90 |
| 2008/0048529 A1 * | 2/2008 | Shimoyama | 310/49 R |

FOREIGN PATENT DOCUMENTS

JP   8-126290   5/1996

OTHER PUBLICATIONS

Machine translation of foreign document JP 08126290.*

* cited by examiner

*Primary Examiner* — Quyen Leung
*Assistant Examiner* — Alex W Mok
(74) *Attorney, Agent, or Firm* — Cantor Colburn LLP

(57) ABSTRACT

A motor may include a stator formed with a rotor arrangement hole, a rotor disposed in the rotor arrangement hole, and a plate-like member disposed on at least one end side in an axial direction of the stator. The plate-like member is joined with an end face of the stator structured such that a peripheral edge part of the plate-like member is melted. In this case, it is preferable that the peripheral edge part of the plate-like member is joined with the end face of the stator structured such that an edge part on an opposite side to a face contacting with the end face of the stator is melted by irradiation of a laser beam.

4 Claims, 5 Drawing Sheets

MOTOR AND IT'S MANUFACTURING METHOD

CROSS REFERENCE TO RELATED APPLICATION

The present invention claims priority under 35 U.S.C. §119 to Japanese Application No. 2008-2769 filed Jan. 10, 2008 the entire contents of which are incorporated herein by reference.

FIELD OF THE INVENTION

At least an embodiment of the present invention may relate to a motor and a manufacturing method for the motor. Specifically, at least an embodiment of the present invention may relate to a motor which is provided with a plate-like member on at least one end side in an axial direction of a stator, and may relate to a manufacturing method for the motor.

BACKGROUND OF THE INVENTION

A common stepping motor is structured of predetermined members such as a rotor including a permanent magnet and a rotation shaft, bearings rotatably supporting the rotation shaft of the rotor, coils, inner yokes and outer yokes.

Laser welding is utilized to assemble these members (see, Japanese Patent Laid-Open No. Hei 08-126290). When laser welding is utilized, two members can be joined with each other while being positioned with a high degree of accuracy in comparison with other welding methods.

In the above-mentioned Patent Reference, for example, when a mounting flange is to be joined with an outer yoke, a laser beam is irradiated to penetrate through the mounting flange to locally melt joining faces of the mounting flange and the outer yoke. In this manner, the mounting flange is welded with the outer yoke. Further, similarly, when the outer yoke is to be joined with an inner yoke, the laser beam is irradiated to penetrate through the outer yoke to weld the outer yoke with the inner yoke.

As described above, at the time of laser welding for assembling a motor, laser is irradiated to penetrate at least one or more members to be joined, and joining faces of a plurality of the members are melted and joined with each other.

However, the above-mentioned structure has the following problems. When it is structured that a laser beam is penetrated through a plate-like member such as a mounting flange to be welded, a welded trace is appeared on its surface but the welded part of the plate-like member such as the mounting flange with the outer yoke is not exposed outside. Therefore, the welded state is unable to be directly confirmed visually. In other words, the welded portion between the members do not appear outside and thus the welded state can not be directly confirmed.

Further, a winding coil is provided in the inside of the yokes. Therefore, when the laser beam is irradiated too intense, the laser beam penetrates through the yoke to reach to the winding coil and, as a result, disconnection or short circuit of the winding coil may occur. On the other hand, when the laser beam is too weak, joining strength of the plate-like member with the outer yoke may be insufficient. As described above, adjustment of intensity and time period of the laser beam to be irradiated is required to perform strictly and thus the adjustment is difficult.

SUMMARY OF THE INVENTION

In view of the problems described above, at least an embodiment of the present invention may advantageously provide a motor in which a joined state is easily confirmed in a case that a plate-like member is melted to be joined with a yoke (stator) and provide a manufacturing method for the motor. Further, at least an embodiment of the present invention may advantageously provide a motor in which a laser beam to be irradiated is easily adjusted and provide a manufacturing method for the motor.

According to at least an embodiment of the present invention, there may be provided a motor including a stator which is formed with a rotor arrangement hole, a rotor which is disposed in the rotor arrangement hole, and a plate-like member which is disposed on at least one end side in an axial direction of the stator. The plate-like member is joined with an end face of the stator by means of that a peripheral edge part of the plate-like member is melted.

According to the structure described above, since the peripheral edge part of the plate-like member is melted to be joined with the stator, the joined portion is exposed outside. Therefore, the joined state can be easily confirmed. Further, according to the embodiment of the present invention, a laser beam is not required to penetrate through the plate-like member. Therefore, the laser beam is easily adjusted when the plate-like member is to be joined with the stator.

In accordance with an embodiment of the present invention, the stator is mounted with a bearing plate having a bearing part that rotatably supports a rotation shaft of the rotor, and movement in the axial direction of the bearing plate is restricted by a bearing pressing part of the plate-like member, and the bearing pressing part is protruded on an outer peripheral side from the melted peripheral edge part. According to this structure, coming-off or falling due to impact or vibration of the bearing plate or the rotor can be prevented or restrained.

Further, it is preferable that the plate-like member includes an urging part for urging the rotor in the axial direction and at least the peripheral edge part located in the vicinity of the urging part is joined. According to this structure, since the vicinity of the urging part is welded, the position of the urging part is prevented from being shifted. Therefore, an appropriate pressurization can be applied to the rotor.

Further, it is preferable that the peripheral edge part of the plate-like member is joined to the end face of the stator by means of that an edge part on an opposite side to a face contacting with the end face of the stator is melted by irradiation of a laser beam. In addition, it is preferable that metal of the plate-like member melted by irradiation of the laser beam is extended over the peripheral edge part and the end face of the stator to form a joining part between the stator and the plate-like member. According to this structure, an edge part of the plate-like member is melted by irradiation of the laser beam, and metal of the plate-like member melted by irradiation of the laser beam is extended to form a joining part between the stator and the plate-like member. Therefore, the joined state is visible and a stable joined state can be formed without forming a through-hole in the stator due to irradiation of the laser beam.

Further, in view of the problems described above, at least an embodiment of the present invention may advantageously provide a manufacturing method for a motor having a stator which is formed with a rotor arrangement hole, a rotor which is disposed in the rotor arrangement hole, and a metal plate-like member which is disposed at least on an end side in an axial direction of the stator, including irradiating a laser beam on a peripheral edge part of the plate-like member to melt the peripheral edge part, and joining the plate-like member with an end face in the axial direction of the stator by using melted portion of the peripheral edge part.

In accordance with an embodiment of the present invention, an edge part on an opposite side to a face contacting with the end face of the stator is melted by irradiation of the laser beam. In addition, it is preferable that the laser beam is focused on an outer peripheral edge part side of the plate-like member with respect to the end face of the stator to melt the outer peripheral edge part, and metal of the plate-like member melted by irradiation of the laser beam is extended over the peripheral edge part and the end face of the stator to join the plate-like member with the stator. According to the embodiment described above, heat due to irradiation of the laser beam is generated at the peripheral edge part of the plate-like member and thus effect of the heat is restrained to transmit to the stator. Therefore, deformation due to heat of the stator is prevented and the laser beam is not required to penetrate like the conventional technique and thus appropriate melting, i.e., appropriate welding can be attained.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 1(*a*) is its partially sectional view and FIG. 1(*b*) is its plan view that is viewed from a side where a plate-like member is joined with.

FIG. 3(*a*) is its plan view and FIG. 3(*b*) is an "A-A" cross-sectional view in FIG. 3(*a*).

DETAILED DESCRIPTION OF THE PREFERRED EMBODIMENTS

An embodiment of the present invention will be described in detail below with reference to the accompanying drawings.

First, a structure of a motor 2 in accordance with an embodiment of the present invention will be described below.

Figure 1A:
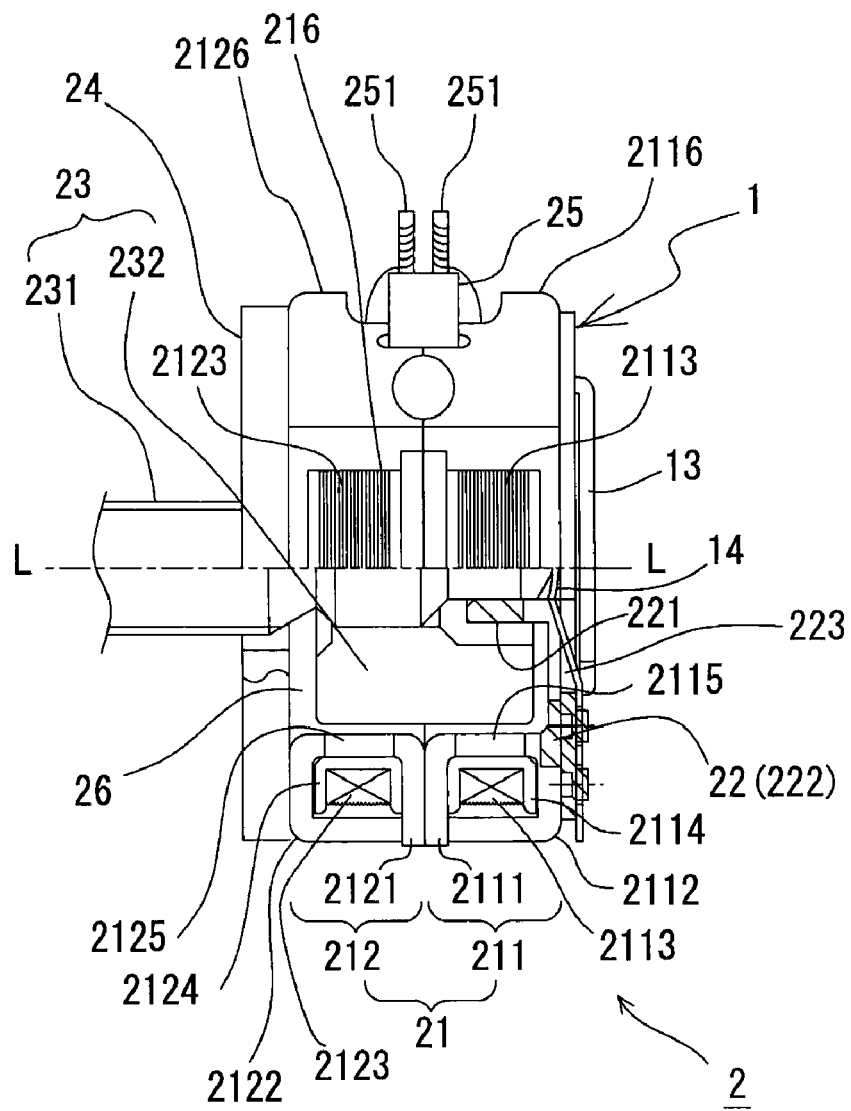
FIGS. 1(*a*) and 1(*b*) are views showing structure of a motor in accordance with an embodiment of the present invention.
Figure 1:
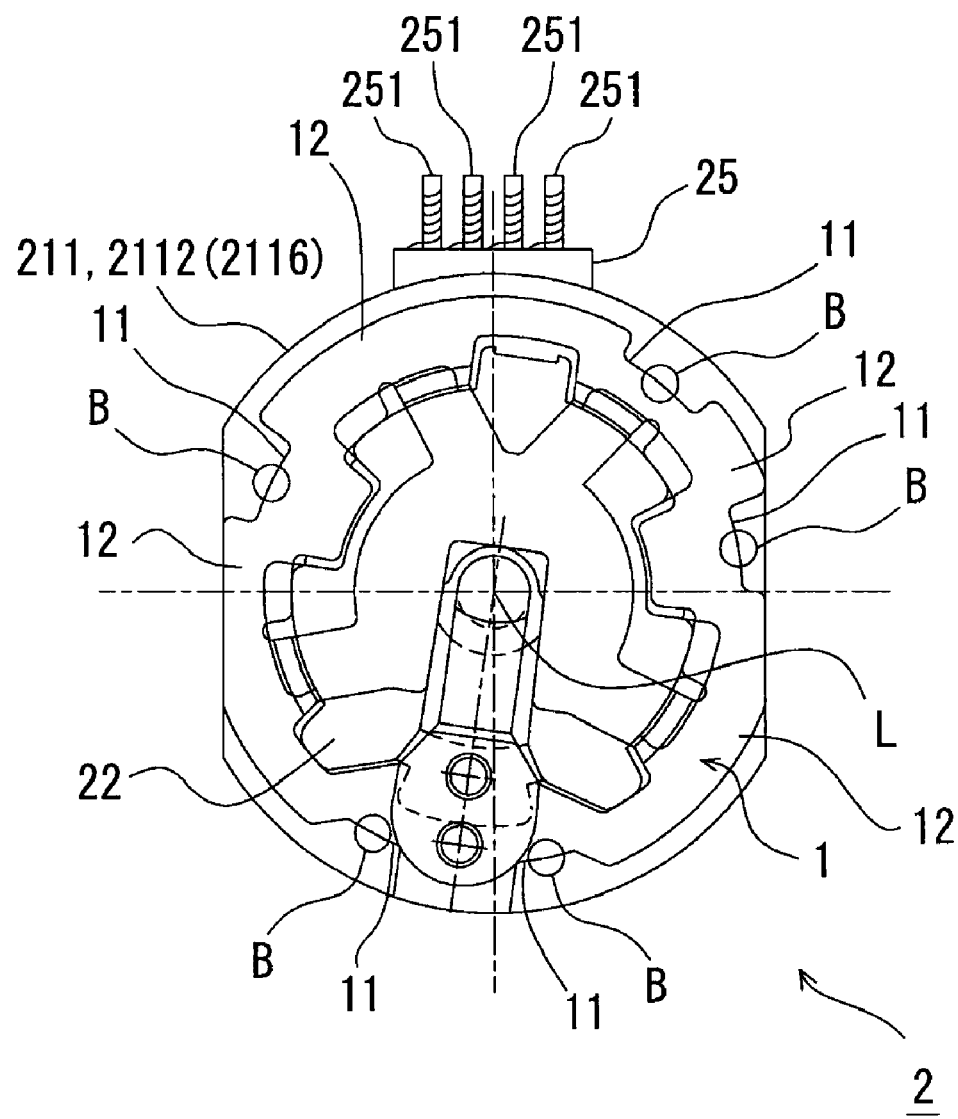

FIGS. 1(*a*) and 1(*b*) are views schematically showing the structure of the motor 2 in accordance with an embodiment of the present invention. FIG. 1(*a*) is a partially sectional view showing the motor 2 in accordance with an embodiment of the present invention and FIG. 1(*b*) is a plan view showing the motor 2 in accordance with an embodiment of the present invention which is viewed from an end face side with which a plate-like member 1 is joined.

As shown in FIGS. 1(*a*) and 1(*b*), the motor 2 in accordance with an embodiment of the present invention includes a rotor 23 provided with a rotation shaft 231, a stator 21 which is disposed on an outer peripheral side of the rotor 23 and provided with a rotor arrangement hole 26 for disposing the rotor 23 on its inner side, a bearing plate 22 which is mounted on an opposite-to-output side of the stator 21 for supporting the rotation shaft 231, and a plate-like member 1 which is disposed on one end side in an axial direction "L" of the stator 21 (in this embodiment, on an opposite-to-output side).

The rotor 23 is provided with the rotation shaft 231 and a permanent magnet 232. As shown in FIG. 1(*a*), the permanent magnet 232 is fixed on a base end side of the rotation shaft 231 (side opposite to a side where rotation power is outputted). An "N"-pole and an "S"-pole are alternately magnetized on the permanent magnet 232 in a circumferential direction of the rotation shaft 231. A lead screw is formed on an outer peripheral face of a portion on an output side of the rotation shaft 231 which is protruded from the stator 21. The base end side of the rotation shaft 231 is supported in a radial direction by the bearing plate 22 and its output side is supported by a bearing or the like not shown.

The stator 21 includes a first stator assembly 211 and a second stator assembly 212 which are disposed on an outer peripheral side of and at positions opposite to the permanent magnet 232. The first stator assembly 211 and the second stator assembly 212 are superposed on each other in the axial direction "L" of the rotation shaft 231 of the rotor 23. In other words, the stator 21 is structured in a two-layer structure with the use of the first stator assembly 211 and the second stator assembly 212. Further, the stator 21 is formed with a rotor arrangement hole 26 at its center portion for accommodating the rotor 23. In a state where the rotor 23 is disposed, a predetermined clearance is formed between an inner peripheral face of the stator 21 and an outer peripheral face of the rotor 23 (permanent magnet 232).

The first stator assembly 211 and the second stator assembly 212 respectively include inner stator cores 2111 and 2121, coil bobbins 2114 and 2124 around which drive coils 2113 and 2123 are wound, and outer stator cores 2112 and 2122. The coil bobbins 2114 and 2124 are disposed between the inner stator cores 2111 and 2121 and the outer stator cores 2112 and 2122 so as to be sandwiched.

Figure 2:
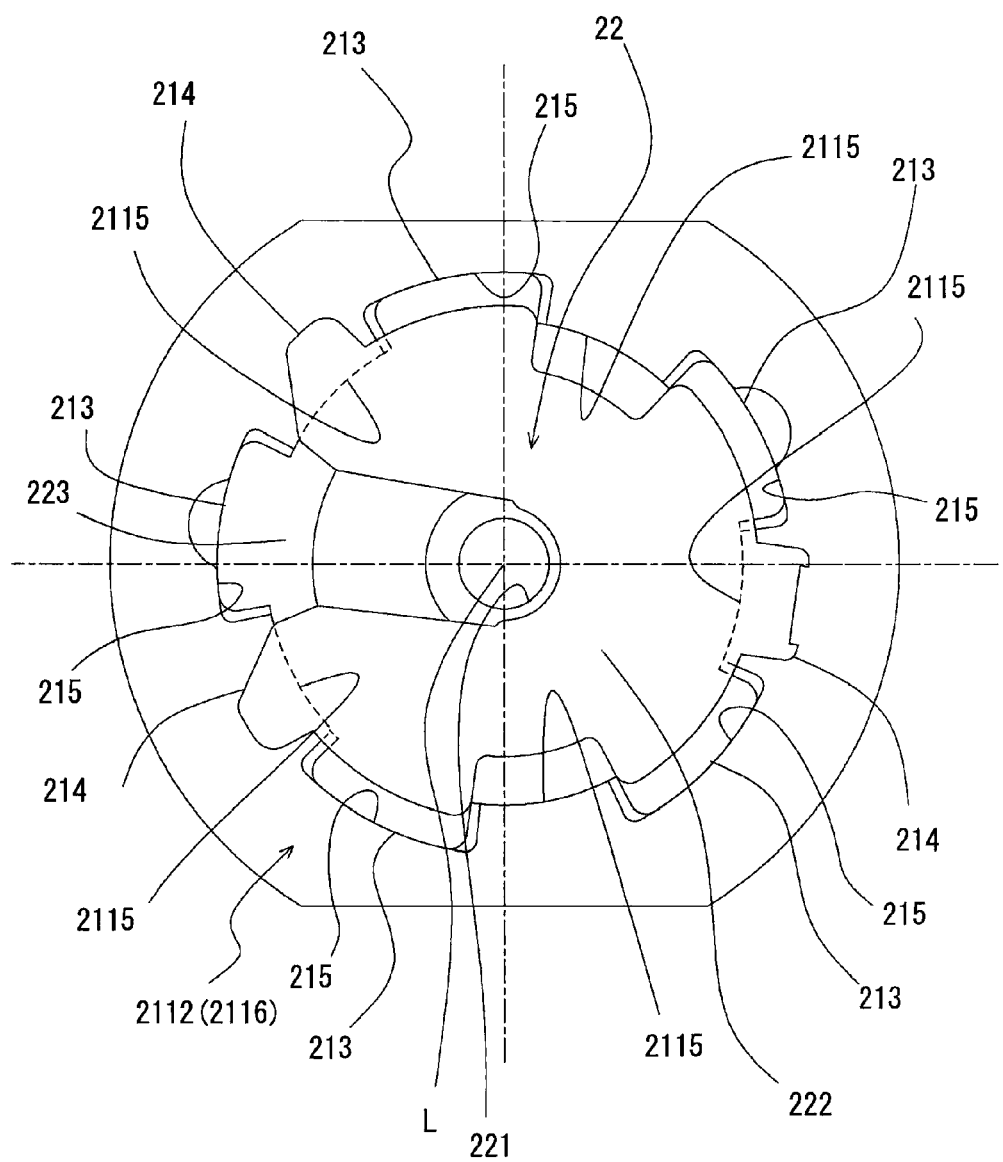
FIG. 2 is a plan view showing a motor in accordance with an embodiment of the present invention, which is viewed from a base end part side and which shows a connected state of a bearing plate with a stator where a plate-like member is removed.

The inner stator cores 2111 and 2121 and the outer stator cores 2112 and 2122 are respectively formed with a plurality of pole teeth 2115 and 2125, which are formed upright in the axial direction "L" at their inner circumferential edges in an equal interval. More specifically, as shown in FIG. 2, the outer stator core 2112 is formed with five pole teeth 2115 upright in the axial direction "L" from the inner circumferential edge of the rotor arrangement hole 26 (toward left side in FIG. 1(*a*) and toward back side in the paper in FIG. 2). A recessed part 215 which is recessed radially is formed between one pole tooth 2115 and an adjacent pole tooth 2115. In accordance with an embodiment of the present invention, also in the inner stator cores 2111 and 2121 and the outer stator core 2122, similarly, five pole teeth 2115 and 2125 are formed upright from the inner circumferential edge of the rotor arrangement hole 26 and a recessed part 215 which is recessed radially is formed between one pole tooth and an adjacent pole tooth of the respective pole teeth 2115 and 2125.

The plurality of the pole teeth 2115 and 2125, which are formed in the inner stator core 2111 and the outer stator core 2112, and in the inner stator core 2121 and the outer stator core 2122, are disposed on the inner peripheral sides of the respective coil bobbins 2114 and 2124 so as to be alternately adjacent to each other.

In other words, in the motor 2 in accordance with an embodiment of the present invention, a plurality of the pole teeth 2115 is formed in the inner stator core 2111 and the outer stator core 2112 of the first stator assembly 211, and the drive coil 2113 formed in a circular ring shape is disposed on the outer periphery of the pole teeth 2115 through the coil bobbin 2114. Similarly, a plurality of the pole teeth 2125 is formed in the inner stator core 2121 and the outer stator core 2122 of the second stator assembly 212, and the drive coil 2123 in a circular ring shape is disposed on the outer periphery of the pole teeth 2125 through the coil bobbin 2124. An insulating film is formed on the surfaces of the drive coils 2113 and 2123. Further, the rotor arrangement hole 26 for allowing to dispose the rotor 23 (permanent magnet 232) is formed in the inside of each of the stator assemblies 211 and 212 (inside of the entire stator 21).

Outer peripheral portions of the outer stator cores 2112 and 2122 are formed to be bent upright so as to cover the outer peripheries of the drive coils 2113 and 2123 and function as a motor case. The portions of the outer stator cores 2112 and 2122 which cover the outer peripheries of the drive coils 2113 and 2123 are referred to as a first motor case 2116 and a second motor case 2126. The first motor case 2116 and the second motor case 2126 are formed in a cylindrical shape by drawing working. In this embodiment, opening parts 216 which are cut out in a predetermined size are formed in a side wall face. Therefore, as shown in FIG. 1(b), the motor 2 is formed in a so-called oval-like shape.

A mounting plate 24 which is a metal plate-like member is fixed by welding to an end face on the output side of the outer stator core 2122, which is on one end side in the axial direction "L" of the stator 21, in other words, to an end face on the side where the rotation shaft 231 of the rotor 23 is protruded outside. The mounting plate 24 and the outer stator core 2122 may be welded to each other by utilizing a welding method of the plate-like member 1 with the outer stator core 2112 which will be described below and therefore, detailed description of the welding method is omitted. The mounting plate 24 is formed with a through-hole for allowing an output side portion of the rotation shaft 231 (protruded portion from the stator 21) to pass through and the mounting plate 24 is a member for mounting the motor 2 on another device.

A terminal block 25 is fixed to the outer peripheral edges of the inner stator cores 2111 and 2121. The terminal pins 251 are provided in the terminal block 25. The terminal block 25 is fixed to the inner stator cores 2111 and 2121 by insert-molding, press fitting or the like. In this embodiment, the terminal block 25 is integrally molded with the coil bobbins 2114 and 2124. The terminal pin 251 is, for example, made of meal material and fixed to the terminal block 25 by press fitting or the like. An end part of a wire of the respective drive coils 2113 and 2123 is bound to the terminal pin 251 which is fixed to the terminal block 25.

A bearing plate 22 for rotatably supporting the rotation shaft 231 of the rotor 23 is disposed on the outer stator core 2112, which is the other end side in the axial direction "L" of the stator 21, i.e., the side where the rotation shaft 231 of the rotor 23 does not protrude outside. The bearing plate 22 is, for example, formed of resin material. The bearing plate 22 includes a bearing part 221, which is formed in a cylindrical shape for supporting the base end part of the rotation shaft 231 of the rotor 23 (end part on the side where the permanent magnet 232 is disposed) in the radial direction, and a flange part 222 which is a plate-shaped portion capable of being fitted (press fitted) to the outer stator core 2112. The bearing plate 22 is press fitted and fixed to the inside of the stator 21 from the side of the outer stator core 2112, i.e., from the side where the rotation shaft 231 of the rotor 23 does not protrude.

As shown in FIG. 1(a), the bearing part 221 is extended within the rotor arrangement hole 26 of the stator 21 from a roughly center portion of the flange part 222. Further, the flange part 222 is disposed so as to be fitted by press fitting or the like on one end side of the outer stator core 2112, i.e., on the side where the rotation shaft 231 of the rotor 23 does not protrude. Specifically, as shown in FIG. 2, the flange part 222 is formed in a disk-like shape and includes a first protruded part 213, which is located in the recessed part 215 that is recessed radially between the plurality of pole teeth 2115 of the outer stator core 2112, and a second protruded part 214 which is placed on the end face of the portion where the pole tooth 2115 is formed. In this embodiment, the first protruded part 213 is formed at five positions in an equal interval and the second protruded part 214 is formed at three positions in predetermined intervals. Further, in the first protruded part 213, its outer peripheral face in the radial direction is abutted with an inner peripheral face of the recessed part 215 between the pole teeth 2115, and the outer peripheral face of the disk-shaped flange part 222 is press-fitted so as to abut with the inner peripheral faces of the pole teeth 2115. As a result, the bearing part 221 is disposed so as to be accurately positioned in the radial direction to the outer stator core 2112. Further, the second protruded part 214 is placed on the end face of the portion of the outer stator core 2112 where the pole teeth 2115 are formed and thus the bearing plate 22 is also positioned in the axial direction.

Further, the disk-shaped flange part 222 is formed with a cavity part 223 where resin is not filled and thus an urging part 14 of the plate-like member 1 is capable of disposing within the stator 21.

Figure 3A:
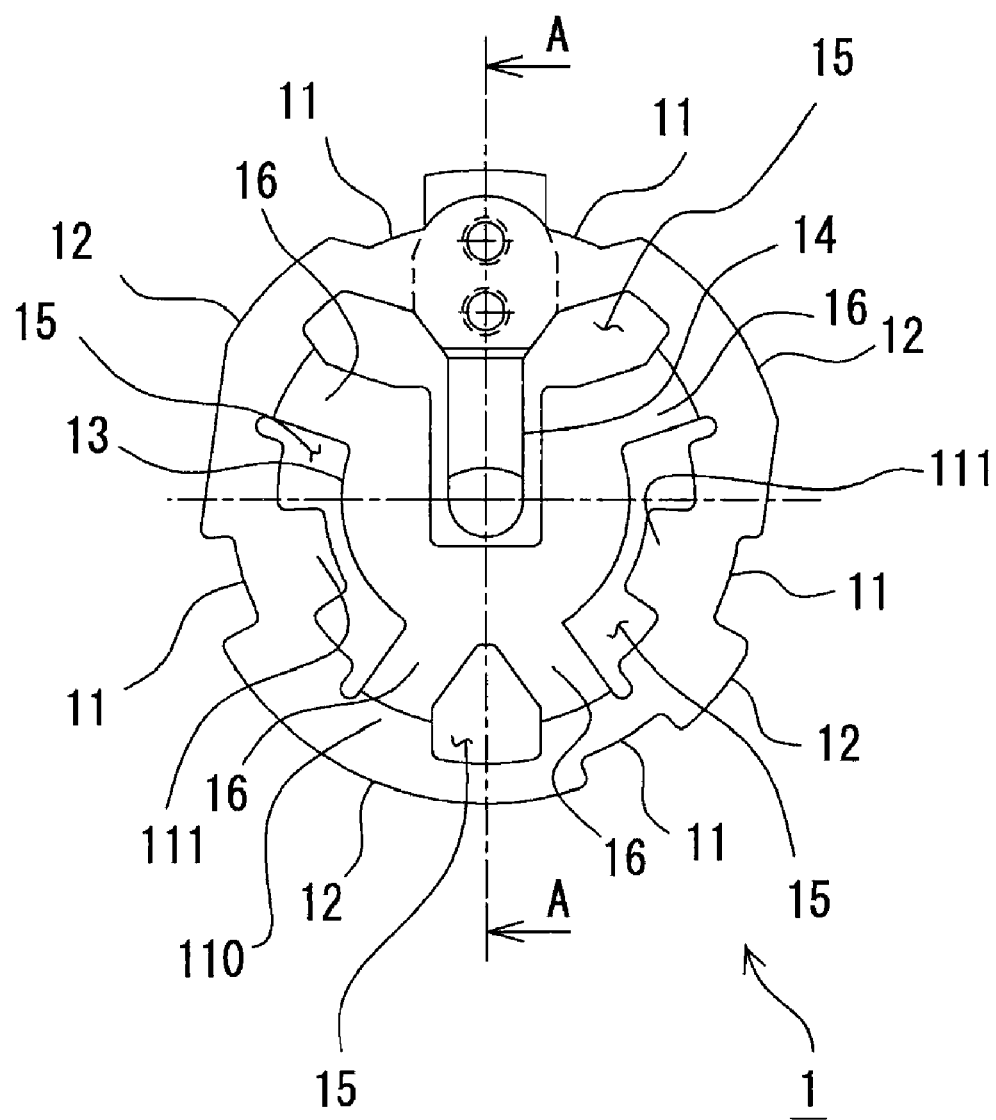
FIGS. 3(*a*) and 3(*b*) are views showing a plate-like member which is joined with a motor in accordance with an embodiment of the present invention.
Figure 3B:
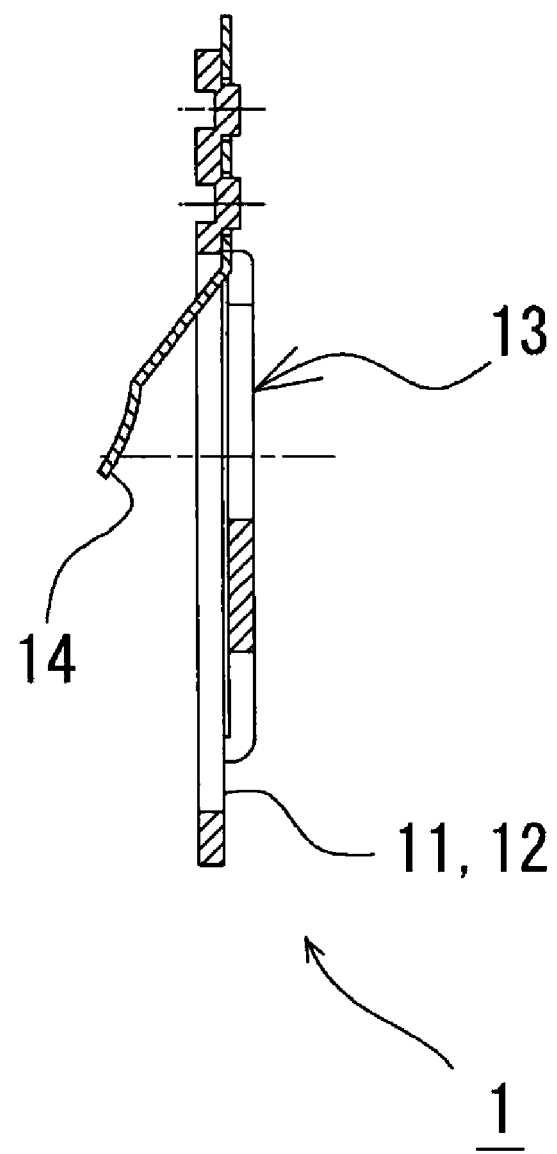

FIGS. 3(a) and 3(b) are views showing the plate-like member 1 which is arranged in a motor in accordance with an embodiment of the present invention. FIG. 3(a) is a plan view showing the plate-like member 1 and FIG. 3(b) is the "A-A" cross-sectional view in FIG. 3(a).

The plate-like member 1 shown in FIGS. 3(a) and 3(b) is a thin metal member such as SUS (Stainless Used Steel), which is mounted on one end side in the axial direction "L" of the stator 21 in the motor 2 in accordance with an embodiment of the present invention. The plate-like member 1 functions to press the bearing plate 22 of the motor 2 and to apply pressurization to the rotation shaft 231 of the rotor 23.

As shown in FIGS. 3(a) and 3(b), the plate-like member 1 is an urging member for urging an shaft end on the base end side of the rotation shaft 231 in the axial direction "L", and includes a main body part 110 mounted on the end face of the stator 21, i.e., on the end face of the outer stator core 2112, and an urging part 14 which urges the shaft end on an opposite-to-output side of the rotation shaft 231 of the rotor 23. The main body part 110 includes a recessed part 11 for joining which is formed in a roughly circular ring shape and which is used to form a joining part, i.e., a fixing part to the outer stator core 2112, a first bearing pressing part 12 which is provided with a larger radius than the recessed part 11 for joining, in other words, which is protruded to the outer side in the radial direction from the recessed part 11, and a second bearing pressing part 13 which is formed on an inner side of the recessed part 11 in a roughly circular ring shape. The main body part 110 restricts movement in the axial direction "L" of the bearing plate 22. The urging part 14 is extended toward the inner side in the radial direction from the two recessed parts 11 for joining.

The recessed part 11 for joining where a joining part i.e., a fixing part is formed, is a portion where the plate-like member 1 is joined with the stator 21 of the motor 2. The recessed part 11 and the first bearing pressing part 12 are formed in a roughly circular ring shape. In other words, a portion having a smaller radius of the portion formed in the roughly circular ring shape is the recessed part 11 for joining and a portion having a larger radius with respect to the recessed part 11 is the first bearing pressing part 12. The first bearing pressing part 12 formed in a circular ring shape is formed with the recessed part 11 which is cut out toward the inner side in the radial direction to be formed in a recessed shape. Alternatively, the first bearing pressing part 12 may be expressed as the portion which is protruded toward the outer side in the radial direction from the recessed part 11.

Tongue-shaped parts 111 extending toward the inner side from the circular ring shape are formed on the inner peripheral side of the recessed part 11 for joining. In other words, when the recessed part 11 for joining is formed by means of that the outer periphery of the first bearing pressing part 12 is cut out toward the inner side in the radial direction, it may be expressed that the tongue-shaped parts 111 located on the inner periphery of the recessed part 11 for joining are formed to be extended toward the inner side in the radial direction. As described above, when the first bearing part pressing part 12 having a large diameter and the tongue-shaped part 111 having a small diameter are provided with respect to the recessed part 11 for joining, the plate-like member 1 is formed to be a wide-width member and thus a width of a metal plate can be secured larger. For example, even when the plate-like member 1 is formed by press working, since the plate-like member 1 is formed as a wide-width member, deformation is hardly occurred and thus the plate-like member 1 can be formed with a high degree of accuracy.

As shown in FIG. 3(*a*), it is preferable that the recessed part 11 for joining is formed at least in the vicinities on both sides of the base end part of the urging part 14. In FIG. 3(*a*), the recessed part 11 is formed at total five positions, i.e., two positions in the vicinities of the base end part, or right and left positions of the base end part of the urging part 14, and three positions separated with predetermined distances from the base end part of the urging part 14. In the five recessed parts 11 for joining, a laser beam is irradiated on the peripheral edge part of the plate-like member 1 so as to melt the edge part, and the joining part for joining the plate-like member 1 with the outer stator core 2112 is formed by using the melted material of the peripheral edge part. Specifically, two recessed parts 11 for joining are formed so as to interpose the base end part of the urging part 14. As described above, two recessed parts 11 are formed so as to interpose, i.e., the right and left positions of the base end part of the urging part 14 and thus the function of the urging part 14, i.e., the function for applying pressurization to the rotation shaft 231 of the rotor 23, can be stabilized. In other words, the vicinity of the base end part of the urging part 14 is fixed to the stator 21 and floating from the end face of the stator 21 is prevented or restrained and thus a spring constant of the entire urging part 14 becomes to be stable. Further, the recessed part 11 is formed at three positions separated with predetermined distances from the base end part of the urging part 14 and thus the outer periphery of the plate-like member 1 is fixed to the stator 21 in a roughly uniform state. Therefore, the plate-like member 1 which is the urging member can be fixed to the outer stator core 2112 in a further preferable state.

The urging part 14 is a portion having a function for applying pressurization to the rotation shaft 231 of the rotor 23 of the motor 2 in the axial direction "L". As shown in FIG. 3(*a*), the urging part 14 is a tongue-shaped portion extending toward the inner side in the radial direction from the inner peripheral face of the recessed part 11 and the first bearing pressing part 12 formed in a circular ring shape. In accordance with an embodiment of the present invention, the urging part 14 is structured as a separated member from the recessed part 11 for joining, the first bearing pressing part 12 and the second bearing pressure part 13 which structure the main body part 110, and the urging part 14 is coupled with the main body part 110 by caulking work or the like. As described above, the urging part 14 is separately formed from the main body part 110 and thus its spring constant can be adjusted easily. In addition, the urging part 14 is, as shown in FIG. 1(*a*) and FIG. 3(*b*), connected with the main body part 110 in a shape so as to be bent on the rotor 23 side and thus a pressure can be applied to the rotation shaft 231.

For example, like a conventional example, when the main body part 110 and the urging part 14 are formed of one sheet of metal plate, respective plate thicknesses are substantially the same. In this case, when the plate thickness is determined in order to attain the function of the main body part 110 (function for preventing the bearing plate 22 and the rotor 23 from coming off), the spring constant of the urging part 14 becomes too large and thus a spring force for applying an appropriate urging force is not attained and the urging part 14 does not urge the rotation shaft 231 preferably. Alternatively, when the plate thickness is determined in order to attain the function of the urging part 14 (function for applying pressurization to the rotor 23), pressing strength of the main body part 110 against the bearing plate 22 and the rotor 23 is insufficient and thus it is difficult to securely press the bearing plate 22 and the rotor 23. However, in this embodiment of the present invention, while the plate thickness of the main body part 110 is set to be 0.2 mm, the plate thickness of the urging part 14 is set to be about 0.08 mm and the spring constant of the urging part is set to be about 100 g/mm. The spring constant can be easily set in a desired value.

Specifically, thicknesses of the recessed part 11 for joining, the first bearing pressing part 12 and the second bearing pressing part 13, which structure the main body part 110, are formed larger than a thickness of the urging part 14. In other words, since a strength of the main body part 110 (strength for pressing the bearing plate 22 and the rotor 23) is secured, the rotor 23 and the bearing plate 22 can be prevented from coming off when an impact or the like is applied to the rotor 23. Further, the thickness of the urging part 14 is set to be thinner than that of the main body part 110 and thus a predetermined spring constant can be applied to the rotor 23. In addition, as shown in FIGS. 1(*a*) and 1(*b*) and FIG. 3(*b*), the urging part 14 is coupled with the main body part 110 in the shape that the urging part 14 is bent toward the rotor 23 side. Therefore, the urging part 14 is capable of applying a pressure to the rotation shaft 231. Accordingly, the urging member 1 can be structured which is capable of applying an appropriate pressurization to the rotor 23 and, in addition, which is capable of preventing lowering of pressing function for the bearing plate 22 and the rotor 23.

The second bearing pressing part 13 is disposed on the inner side of the recessed part 11 for joining and the first bearing pressing part 12 which are formed in a roughly circular ring shape. The second bearing pressing part 13 is formed in a roughly "U"-shape to avoid interference with the urging part 14. In other words, the urging part 14 is disposed on the inner side of the second bearing pressing part 13 which is formed in a roughly "U"-shape. Further, as shown in FIG. 1(*a*) and FIG. 3(*b*), the second bearing pressing part 13 is provided with a bag-like shape which is protruded on the outer side in the axial direction "L" of the motor 2. Therefore, the second bearing pressing part 13 is disposed so as to cover an outer end face of a center portion of the disk-shaped flange part 222 of the bearing plate 22 through a predetermined gap space while avoiding interference with the urging part 14. A gap space width between the second bearing pressing part 13 and the outer end face of the flange part 222 of the bearing plate 22 is set to be a dimension so that the tongue-shaped part 111 of the plate-like member 1 which directly presses the outer peripheral portion of the bearing plate 22 is not plastically deformed by the bearing plate 22. In other words, when an excessive impact is applied to the rotor 23 and a force is acted on the bearing plate 22 for moving it in the axial direction "L", since the outer periphery of the bearing plate 22 made of resin is press-fitted to the outer stator core 2112, a center portion of the bearing plate 22 where the impact is strongly transmitted, in other words, the periphery of the bearing part 221 for supporting the shaft end of the rotation shaft 231 is deformed in a curved shape. A width of the gap space between the second bearing pressing part 13 and the end face of the bearing plate 22 is set so as to abut with each other before the tongue-shaped parts 111 of the plate-like member 1 which directly press the outer peripheral portion of the bearing plate 22 are plastically deformed when the bearing plate 22 is deformed in the curved shape. Therefore, even when an excessive impact is applied to the rotor 23, plastic deformation of the tongue-shaped part 111 of the plate-like member 1 is prevented and a function for preventing coming-off of the bearing plate 22 and the rotor 23 is maintained.

The second bearing pressing part 13 is connected with the recessed part 11 for joining and the first bearing pressing part 12 through a plurality of band plate-shaped portions 16 (four portions in this embodiment). In other words, a plurality of through-holes 15 is formed between the second bearing pressing part 13 and the recessed part 11 and the first bearing pressing part 12 so as to surround the second bearing pressing part 13.

Next, a fixing method of the plate-like member 1 and the bearing plate 22 to the stator 21 will be described below. In this embodiment, a laser beam is irradiated to the recessed part 11 for joining which is a peripheral edge part of the plate-like member 1 to melt the peripheral edge part of the recessed part 11, and the plate-like member 1 and the stator 21 are joined with and fixed to each other by using the melted material of the peripheral edge part. For a laser in this embodiment, a well-known laser such as a carbon dioxide laser or a YAG (Yttrium Aluminum Garnet) laser may be utilized.

Specifically, as shown in FIG. 2, the bearing plate 22 is press-fitted in the rotor arrangement hole 26 of the outer stator core 2112 of the stator 21. In this case, the first protruded part 213 of the bearing plate 22 is fitted to the recessed part 215 between the pole teeth 2115, and the second protruded part 214 is placed on the end face of the pole teeth 2115. Further, the outer periphery of the disk-shaped flange part 222 is abutted with and fixed to the inner circumferential edges of the pole teeth 2115. In this manner, the bearing plate 22 is positioned and fixed in the radial direction and the axial direction to the outer stator core 2112.

As shown in FIGS. 1(a) and 1(b), the plate-like member 1 which is an urging member is joined with the stator 21, i.e., the end face of the outer stator core 2112 (end face where the rotation shaft 231 of the rotor 23 does not protrude). Specifically, a laser beam is irradiated on the peripheral edge part of the recessed part 11 for joining of the plate-like member 1 to partly melt the peripheral edge part of the plate-like member 1 and the melted metal of the peripheral edge part of the plate-like member 1 is extended over the end face of the outer stator core 2112 and a joining part of the outer stator core 2112 with the plate-like member 1 is structured. Further specifically, the laser beam is converged and irradiated in a spot-like manner on the peripheral edge part of the end face of the plate-like member 1 which is opposite to an end face contacting with the end face of the outer stator core 2112 to locally melt the peripheral edge part of the plate-like member 1. In other words, the melted metal of the peripheral edge part of the plate-like member 1 is used as joining material between the outer stator core 2112 and the plate-like member 1 and, in this manner, the plate-like member 1 is joined with the end face of the stator 21 by the melted metal. The position where the joining part is formed by irradiating the laser beam is, as shown by the notational symbol "B" in FIG. 1(b), selected at least in the vicinity of the base end part of the urging part 14. In addition, it is preferable that other positions are set to have a roughly equal interval in the circumferential direction.

Further, joining strength is insufficient when the plate-like member 1 is joined at the position near an "R" part (edge part) of the stator 21, i.e., in a boundary portion with the motor cases 2116 and 2126. Therefore, in this embodiment of the present invention, the recessed part 11 is formed on an inner flat portion with respect to the "R" part and the first bearing pressing part 12 is protruded from the recessed part 11 to extend to the position of or the vicinity of the "R" part (edge part) of the stator 21. Accordingly, since a width of a metal plate structuring the plate-like member 1 can be secured by forming the first bearing pressing part 12, for example, even when the plate-like member 1 is formed by press working, the plate-like member 1 is difficult to be deformed and thus the plate-like member 1 can be formed with a high degree of accuracy.

As shown in FIG. 1(b), since the recessed part 11 for joining is formed at the peripheral edge part of the plate-like member 1 and at a position away from the boundary portion between the end face of the outer stator core 2112 and the motor case 2116, the joining state of the plate-like member 1 can be visually confirmed from the outside of the motor case 2116. In other words, the joined portion of the plate-like member 1 with the stator 21 in which melted metal of the plate-like member 1 by the laser beam is used as joining material is exposed outside and thus confirmation of the joining state is easy.

Further, in comparison with the conventional joining structure where a laser beam is penetrated through the plate-like member 1 to be joined, adjustment of irradiation time period and intensity of the laser beam is easy. In other words, in the conventional structure, the laser beam is required to be adjusted in a range that the laser beam penetrates through the plate-like member 1 but does not penetrate through the stator 21. On the other hand, in this embodiment of the present invention, the laser beam is converged and irradiated on the peripheral edge part of the end face of the plate-like member 1 which is opposite to the end face contacting with the end face of the outer stator core 2112 to melt the peripheral edge part of the plate-like member 1. Therefore, even when the irradiating position is shifted on the outer stator core 2112 side to some extent, a problem where the outer stator core 2112 is melted does not occur. In other words, irradiation position, irradiation time period and intensity of the laser beam can be easily adjusted. From this point of view, the laser beam is not required to be strictly focused on the peripheral edge part of the plate-like member 1 which is opposite to the end face contacting with the end face of the outer stator core 2112. Even when the focused position of the laser beam is shifted on the outer stator core 2112 side to some extent from the peripheral edge part, the position may be applicable as long as the outer stator core 2112 is not melted.

When the plate-like member 1 is joined with the stator 21, the plate-like member 1, especially the second bearing pressing part 13 restricts movement of the bearing plate 22 and restricts movement in the axial direction of the rotation shaft 231 of the rotor 23. In other words, the bearing plate 22 and the rotor 23 are prevented from being come off from the stator 21 by the plate-like member 1. Further, the urging part 14 of the plate-like member 1 presses the base end part of the rotation shaft 231 of the rotor 23 to apply pressurization to the rotation shaft 231 of the rotor 23.

Next, a manufacturing method for the motor 2 in accordance with an embodiment of the present invention will be described below.

First, the drive coils 2113 and 2123 which are wound around the coil bobbins 2114 and 2124 are mounted on the stator cores 2111, 2121, 2112 and 2122. Specifically, the drive coils 2113 and 2123 formed in a circular ring shape are assembled through the coil bobbins 2114 and 2124 on the outer peripheries of the respective pole teeth 2115 and 2125, which are formed of the inner stator cores 2111 and 2121 and the outer stator cores 2112 and 2122 (drive coil assembling step).

Next, end parts of a winding coil of the respective drive coils 2113 and 2123 are bound on the terminal pins 251 arranged in the terminal block 25 (coil binding step). After the end parts of the winding coil have been bound on the terminal pins 251, the extended portions are cut off (coil cutting step).

Next, the rotor 23 is disposed in the region which is surrounded by the pole teeth 2115 and 2125, i.e., within the rotor arrangement hole 26. After that, the bearing plate 22 is press-fitted on the one end side of the stator 21. Next, the plate-like member 1 is joined with the one end face of the stator 21. The joining method and the joining structure are described above.

According to the embodiment of the present invention, the peripheral edge part of the recessed part 11 for joining of the plate-like member 1 is melted to be joined with the stator 21 and thus the joined portion is exposed outside. Therefore, the joined state is easily confirmed. Further, according to the embodiment of the present invention, the laser beam is not required to penetrate through the plate-like member 1. Therefore, when the plate-like member 1 is to be joined with the stator 21, adjustment of the intensity and the irradiation time period of the laser beam is easy.

Further, according to the structure as described above, coming-off or falling-off of the bearing plate 22 or the rotor 23 due to impact is prevented or restrained.

Further, according to the structure as described above, since the vicinity of the urging part 14 is welded, the position of the urging part 14 does not shift. Therefore, an appropriate pressurization can be applied.

Further, since the peripheral edge part of the recessed part 11 for joining of the plate-like member 1 is melted by the laser beam and the melted portion is used as bonding material, the joined state is visible and thus a stable joined state can be obtained.

According to the structure as described above, heat generated by irradiation of the laser beam is applied to the peripheral edge part of the recessed part 11 for joining and thus the stator 21 does not incur the effect of the heat. Therefore, the laser beam is not required to penetrate like the conventional example and thus appropriate melting is obtained.

Although the present invention has been shown and described with reference to specific embodiments, various changes and modifications will be apparent to those skilled in the art from the teachings herein.

For example, in the embodiment described above, the plate-like member 1 is utilized as an urging member but the plate-like member 1 is not limited to the urging member. For example, the plate-like member 1 may be utilized as an end plate for directly receiving the axial end of the rotation shaft 231 or may be utilized as the mounting plate 24.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A motor comprising:
   a stator which is formed with a rotor arrangement hole;
   a rotor which is disposed in the rotor arrangement hole; and
   a plate-like member which is disposed on at least one end side in an axial direction of the stator;
   wherein an outer peripheral portion of the plate-like member comprises a recessed part which is cut out toward an inner side in a radial direction;
   wherein a peripheral edge part of the recessed part of the plate-like member is joined with an end face of the stator so that an edge of the peripheral edge part on a side of the plate-like member opposite to an end face of the plate-like member that contacts the end face of the stator is melted by irradiation of a laser beam and metal of the peripheral edge part of the recessed part of the plate-like member having been melted is flowed and extended over the end face of the stator to form a joining part on the end face of the stator; and
   wherein the joining part of the peripheral edge part with the end face of the stator is exposed to an exterior of the stator.

2. The motor according to claim 1, wherein
   the stator is mounted with a bearing plate including a bearing part that rotatably supports a rotation shaft of the rotor, and
   movement in the axial direction of the bearing plate is restricted by a bearing pressing part of the plate-like member, and
   the bearing pressing part is protruded on an outer peripheral side from an melted peripheral edge part.

3. The motor according to claim 1, wherein the plate-like member includes an urging part for urging the rotor in the axial direction and at least the peripheral edge part formed in a vicinity of the urging part is joined.

4. The motor according to claim 1, wherein the recessed part is formed on a flat portion of the stator on an inner side with respect to an edge part of the stator and the outer peripheral portion of the plate-like member is protruded from the recessed part to extend to the position of or the vicinity of the edge part of the stator.

* * * * *